United States Patent [19]

Nichols

[11] 4,246,790
[45] Jan. 27, 1981

[54] COMBINATION SPEED TRANSDUCER AND SPEEDOMETER CABLE

[75] Inventor: Wayne C. Nichols, Corunna, Mich.
[73] Assignee: General Motors Corporation, Detroit, Mich.
[21] Appl. No.: 87,012
[22] Filed: Oct. 22, 1979
[51] Int. Cl.³ .......................... G01P 1/07; G01P 3/484
[52] U.S. Cl. ........................................ 73/493; 73/510; 73/519
[58] Field of Search ................. 73/493, 510, 519, 527; 74/12; 324/164, 168

[56] References Cited

U.S. PATENT DOCUMENTS

| | | | |
|---|---|---|---|
| 3,164,698 | 1/1965 | Perrine | 200/87 |
| 3,911,237 | 10/1975 | Naito et al. | 73/493 |
| 4,074,157 | 2/1978 | Lace | 310/67 R |

*Primary Examiner*—James J. Gill
*Attorney, Agent, or Firm*—Warren D. Hill

[57] ABSTRACT

A speedometer cable for a vehicle driven from the vehicle transmission has a speed transducer incorporated in the end fitting which attaches to the transmission housing. The speed transducer comprises, for example, a reed switch driven by a permanent magnet which rotates with the speedometer cable core for opening and closing at a rate dependent on the speed of rotation. The transducer has one terminal grounded through the end fitting to the transmission housing and another lead electrically connected to the reinforcing wire of the speedometer cable. A terminal member with an insulation piercing clip is spaced at a position remote from the end fitting and makes contact with the reinforcing wire to provide an electrical connection between the remote terminal and the reed switch to allow transmission of an electrical speed signal from the reed switch to the remote terminal.

3 Claims, 4 Drawing Figures

U.S. Patent  Jan. 27, 1981  4,246,790
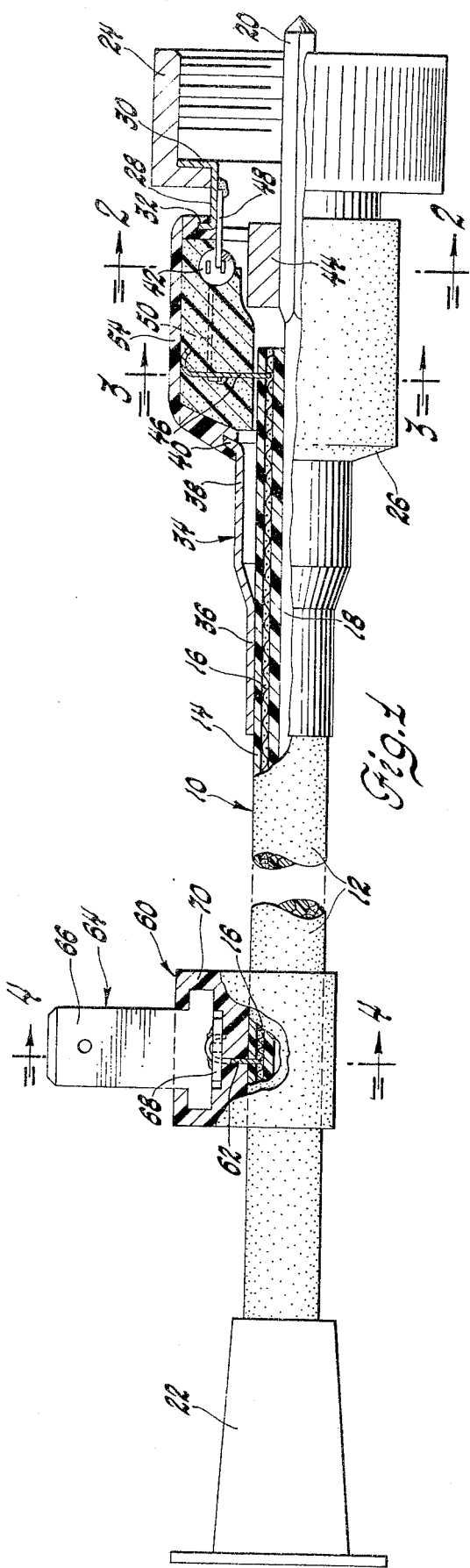
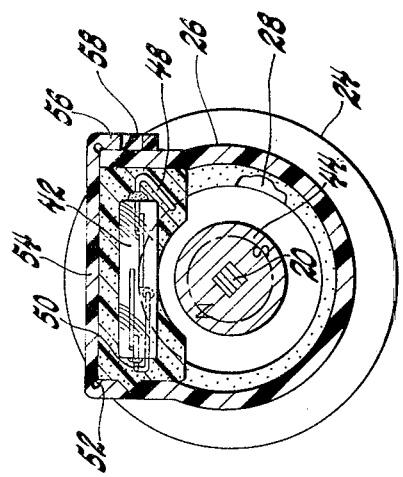
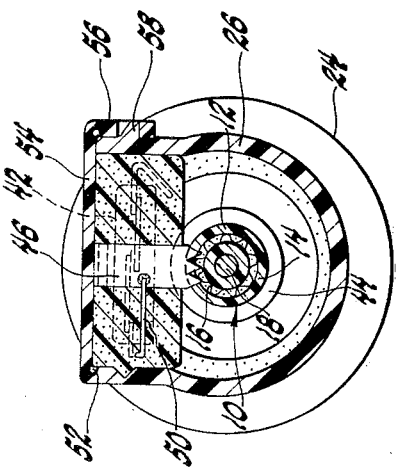
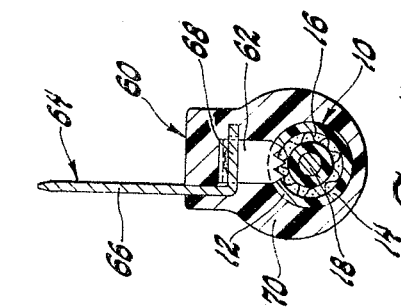

COMBINATION SPEED TRANSDUCER AND SPEEDOMETER CABLE

This invention relates to a combination of an electrical speed transducer and a speedometer cable.

It is conventional practice to drive a mechanical speedometer of an automotive vehicle by a speedometer cable which comprises a flex shaft extending between the speedometer and a gear on the vehicle transmission. It is often desirable, however, to have an electrical vehicle speed signal to provide information for some variety of electrical vehicle control such as a transmission control. It has been proposed to associate an electrical speed transducer with the speedometer cable or the speedometer cable drive at the transmission. Experience with such devices reveals that the best quality electrical signals are obtained from transducers mounted at or near the transmission rather than at or near the speedometer end of the speedometer cable. A speed transducer mounted at the vehicle transmission and associated with the speedometer cable would normally require at least one conductor extending from the transducer to the electrical control located somewhere in the vehicle. Such a conductor would of necessity be exposed in the unprotected region of the transmission and as such be subject to road hazards as well as corrosive elements.

It is, therefore, an object of this invention to provide an electrical speed transducer mounted at the vehicle transmission in conjunction with a speedometer cable and requiring no separate conductor in the region of the transmission for transmitting the electrical speed signal to an area remote from the transmission.

The invention is carried out by providing a speedometer cable having an insulating sheath containing a conductive reinforcing wire embedded in the sheath and a rotatable speedometer core within the sheath, a speed transducer incorporated in the end fitting of the speedometer cable adjacent the transmission, an electrical ground path from the transducer to the transmission, an electrical signal path from the transducer to the reinforcement wire of the speedometer cable, and a terminal on the speedometer cable at a point remote from the transmission making connection through the insulating sheath to the reinforcing wire to thereby provide electrical connection between the terminal and the transducer.

The above and other advantages will be made more apparent from the following specification taken in conjunction with the accompanying drawings wherein like reference numerals refer to like parts and wherein:

FIG. 1 is a partially cross-sectional side view of a speedometer cable combined with a speed transducer and a remote electrical terminal according to the invention.

FIGS. 2 and 3 are cross-sectional views along lines 2—2 and 3—3 respectively of the speed transducer assembly of FIG. 1, and FIG. 4 is a cross-sectional view through the terminal connection taken along lines 4—4 of FIG. 1.

Referring to FIG. 1 a speedometer cable 10 comprises a flex cable of conventional construction and includes a tubular sheath 12 comprising an insulating plastic material 14 with a wire reinforcement 16 embedded therein. The wire reinforcement commonly comprises a large number of steel wires woven together or braided to provide an integral reinforcement structure. Within the tubular sheath 12 is a flexible core 18 also of steel having a round cross-section for easy rotation within the sheath. One end 20 of the core 18 is formed into a square cross-section for convenient coupling in driving relationship to a drive gear, not shown, which is rotated by an output member of a transmission. The speedometer end of the cable 10 is provided with an end fitting 22 for connection to the speedometer and the transmission end of the cable is provided with an end fitting including a nut 24 rotatably attached to the cable 10 for threaded connection to the transmission housing or preferably to a transmission output speed adaptor which is associated with the transmission. The speedometer cable structure as thus far described is conventional and has long been in use on vehicles with mechanical speedometers driven from a transmission mounted speed adaptor.

To accommodate a speed transducer in the end fitting of the speedometer cable adjacent the nut 24, a molded plastic housing 26 is provided adjacent the nut. In particular, a tubular steel ferrule 28 has an outwardly extending radial flange 30 at one end for extending inside the nut 24 and at the other end has an outwardly extending flange 32 which is molded into a wall of the plastic housing 26 so that the nut 24 is trapped between the flange 30 and the housing 26 but is free to rotate. A second ferrule 34 has a small diameter portion 36 crimped over the speedometer cable 10 near its end, and a larger diameter section 38, which terminates in an outwardly extending flange 40, is molded into another wall of the housing 26. Thus, the nut 24, the ferrule 28, the housing 26 and the ferrule 34 are formed in a unitary assembly which is secured to the cable 10. Preferably the assembly is formed by insert molding the housing 26 to the flanges 40 and 32 after the nut 24 has been assembled to the ferrule 28. Thereafter, the ferrule 34 is crimped to the speedometer cable 10 with the end 20 of the core 18 extending through the nut 24 and the end of the sheath 12 extending part way into the housing 26.

The electrical speed transducer comprises a reed switch 42 mounted in the housing 26 and a magnet 44 magnetically coupled with the reed switch and supported on the square cross-section end 20 of the core. The magnet is formed with a square central aperture which mates with the square end 20 so that is will be rotatably driven by the speedometer core. An insulation piercing blade 46 extends laterally into the sheath 12 near the end thereof to affect a secure electrical connection with the metallic braid or reinforcing wire 16 and has another end which extends into the housing 26. The reed switch 42 has a first lead 48 which is soldered to the inner surface of the ferrule 28 and a second lead 50 which is soldered or otherwise electrically and mechanically secured to the blade 46. The portion of the housing 26 containing the reed switch 42 and the blade 46 is filled with potting material to lend structural integrity to the swtich and blade assembly. As shown in FIGS. 2 and 3, the housing 25 is circular in cross-section except in the region containing the reed switch and blade where the housing is essentially rectangular. The housing 26 is formed with a living hinge 52 to form a swingable lid portion 54 which terminates in a flange 56 which is apertured to fasten over projections 58 on a wall of the housing. The hinged lid arrangement allows for the assembly of the reed switch and the blade 46 after the assembly of the end fitting onto the speedometer cable 10.

An electrical connector 60 is fastened to the cable 10 at a location remote from the speed transducer. As shown in FIGS. 1 and 4, the connector 60 includes a second insulation piercing blade 62 which extends through the insulation 14 and into electrical connection with the reinforcing wire 16. An L-shaped terminal 64 includes a connector blade 66 and a perpendicular flange 68 to which the piercing blade 62 is crimped and soldered. A body portion of insulating material 70 is molded around the cable 10 and around the piercing blade 62 and the base of the connector 64 to encapsulate those portions for securing the assembly.

In use, it is necessary that the nut 24 be formed of conductive material and that it be secured directly to the conductive transmission housing or to a conductive adaptor which, in turn, is electrically connected with the transmission housing in order to provide an electrical ground for the lead 48 of the reed switch 42. The lead 50 is connected through the blade 46, the reinforcing wire 16 and the blade 62 to the terminal 64. Thus, the vehicle wiring harness must include a lead and a connector extending only to the site of the connector 60 which can be conveniently and safely located away from the harsh environment and confined spaces of the transmission speedometer adaptor. Thus an electrical circuit connected to terminal 64 can detect the opening and closing of the reed switch 42 as the magnet 44 rotates with the speedometer core.

The embodiments of the invention in which an exclusive property or privilege is claimed are defined as follows:

1. The combination of an electrical speed transducer and a speedometer cable adapted to connect to the transmission of a vehicle comprising
    a speedometer cable having a central rotatable core housed in a sheath, the sheath comprising an insulating tube with a conductive reinforcement embedded therein,
    an end fitting on one end of the sheath including a metallic adaptor for an electrical connection to a transmission housing,
    a transducer within the end fitting comprising a rotor secured to the core for rotation therewith and a stationary signal means coupled to the rotor for producing an electrical signal at a frequency proportional to the rotor speed,
    the signal means having a first lead connected to the said adaptor for electrical grounding therethrough, and a second lead connected to the said conductive reinforcement, and
    an electrical terminal attached to the speedometer cable at a point remote from the said end fitting and electrically connected to the conductive reinforcement, whereby the reinforcement serves as an electrical conductor in circuit with the signal means for carrying speed information to the terminal.

2. The combination of an electrical speed transducer and a speedometer cable adapted to connect to the transmission of a vehicle comprising
    a speedometer cable having a central rotatable core housed in a sheath, the sheath comprising an insulating tube with a reinforcing wire embedded therein,
    an end fitting on one end of the sheath including a metallic adaptor for connection to a transmission housing,
    a transducer within the end fitting comprising a magnet secured to the core for rotation therewith and a reed switch mounted adjacent the magnet which is operated at a frequency proportional to the speed of magnet rotation,
    the reed switch having a first lead connected to the said adaptor for electrical grounding therethrough, and a second lead connected to the said reinforcing wire, and
    an electrical terminal attached to the speedometer cable at a point remote from the said end fitting and electrically connected to the reinforcing wire, whereby the reinforcing wire serves as an electrical conductor in circuit with the reed switch for carrying speed information to the terminal.

3. The combination of an electrical speed transducer and a speedometer cable adapted to connect to the transmission of a vehicle comprising
    a speedometer cable having a central rotatable core housed in a sheath, the sheath comprising an insulating tube with a metallic reinforcement embedded therein,
    an end fitting on one end of the sheath including a metallic adaptor for electrical connection to a transmission housing,
    a transducer within the end fitting comprising a magnet secured to the core for rotation therewith and a reed switch mounted adjacent the magnet which is operated at a frequency proportional to the speed of magnet rotation,
    a first insulation piercing clip within the end fitting and extending partially into the insulating tube in electrical contact with the metallic reinforcement,
    the reed switch having a first lead connected to the said adaptor for electrical grounding therethrough, and a second lead connected to the said metallic reinforcement, and
    an electrical terminal attached to the speedometer cable at a point remote from the said end fitting and including a second insulation piercing clip extending partially into the insulating tube and electrically connected to the metallic reinforcement, whereby the reinforcement serves as an electrical conductor in circuit with the reed switch for carrying speed information to the terminal.

* * * * *